United States Patent [19]

Gillett

[11] Patent Number: 4,800,292
[45] Date of Patent: Jan. 24, 1989

[54] TEMPERATURE SENSING CIRCUIT
[75] Inventor: Jimmie D. Gillett, Garland, Tex.
[73] Assignee: Ranco Incorporated, Dublin, Ohio
[21] Appl. No.: 68,776
[22] Filed: Jun. 24, 1987

Related U.S. Application Data

[63] Continuation of Ser. No. 601,270, Apr. 17, 1984, abandoned.

[51] Int. Cl.⁴ ............................................. H01H 35/00
[52] U.S. Cl. ..................................... 307/117; 307/140; 361/165
[58] Field of Search .................. 307/116, 117, 140; 374/183, 184; 361/165, 170

[56] References Cited

U.S. PATENT DOCUMENTS

| | | | |
|---|---|---|---|
| Re. 31,502 | 1/1984 | Gingras | 361/170 |
| 3,211,214 | 10/1965 | Chambers | 165/28 |
| 3,388,860 | 6/1968 | Kruper | 236/1 |
| 3,415,448 | 12/1968 | Williams et al. | 236/15 |
| 3,426,969 | 2/1969 | Anderson, Jr. | 236/78 |
| 3,512,077 | 5/1970 | Evalds | 323/19 |
| 3,541,359 | 11/1970 | Lewis | 361/165 X |
| 3,616,846 | 11/1971 | Wills | 165/26 |
| 3,624,455 | 11/1971 | Hillman | 361/165 |
| 3,684,172 | 8/1972 | Evalds | 236/78 |
| 3,743,182 | 7/1973 | Harmon et al. | 236/78 |
| 3,809,960 | 5/1974 | Jossic | 361/25 |
| 3,935,519 | 1/1976 | Pfarrer et al. | 318/305 |
| 4,015,182 | 3/1977 | Erdman | 318/334 |
| 4,017,747 | 4/1977 | Sheng | 307/360 X |
| 4,041,542 | 8/1977 | Pfarrer et al. | 361/27 |
| 4,086,558 | 8/1978 | Peionby et al. | 337/102 |
| 4,135,402 | 1/1979 | Wakamatsu et al. | 307/117 |
| 4,210,823 | 7/1980 | Kabat et al. | 307/117 |
| 4,240,077 | 12/1980 | Hughes et al. | 340/500 |
| 4,254,906 | 3/1981 | Hayes | 236/78 D |
| 4,320,309 | 3/1982 | Griffiths et al. | 361/165 X |
| 4,338,511 | 7/1982 | Six | 219/497 |
| 4,371,272 | 2/1983 | Iwasaki | 374/184 |

FOREIGN PATENT DOCUMENTS

| | | |
|---|---|---|
| 1673479 | 7/1971 | Fed. Rep. of Germany . |
| 2466804 | 4/1981 | France . |
| 47632 | 6/1983 | Japan ................................ 374/184 |

OTHER PUBLICATIONS

"Low-Cost Temperature Controller Built with Timer Circuit" by G. R. Lewis, Electronic Design 17, Aug. 16, 1975, p. 82.
"Control with OPAMP Comparator" by Williams, EDN Magazine, Jun. 10, 1977.
Elektor, vol. 9, No. 7/8, Jul./Aug. '83, 7-66, 7-67, Canterbury, Kent, Great Britain, "Interior Temperature Control for Cars".
Electronic Design, vol. 30, No. 16, Aug. '82, p. 217, Denville, N.J., U.S.A.: R. S. Rohella, "Dual-Time Chip Control Temperature while Monitoring Liquid Level".

Primary Examiner—Philip H. Leung
Assistant Examiner—Derek S. Jennings
Attorney, Agent, or Firm—Watts, Hoffmann, Fisher & Heinke

[57] ABSTRACT

A temperature sensing circuit including a temperature sensing element located at a medium to sense the temperature of the medium. The sensing element is a resistive element with a range of resistive values corresponding to a range of sensed temperatures. The sensing element is connected to circuitry for detecting variations of the resistance of the element. The circuitry provides an output signal of one state when the element resistance increases beyond a first value and provides an output signal of a second state when the element resistance decreases beyond a second value.

8 Claims, 2 Drawing Sheets

TEMPERATURE SENSING CIRCUIT

This application is a continuation of application Ser. No. 601,270, filed 4/17/84.

BACKGROUND

1. Field of the Invention

This invention relates to a temperature sensing circuit and, more specifically, to a temperature sensing circuit that provides an output relative to two temperature transition points.

2. Description of Prior Art

Temperature sensing mechanisms are required in many applications to determine temperature levels to insure proper operation of equipment. Traditionally temperature sensing has been accomplished by mechanical devices that rely upon mechanical changes of the device in response to temperature changes of the mechanism. These mechanical devices often develop reliability problems or vary from their designed operational characteristics.

One object of the present invention is to provide a reliable mechanism for sensing temperature.

SUMMARY OF THE INVENTION

In accordance with the present invention, a temperature sensing circuit is provided that includes a temperature sensing element with a resistive value that varies according to the temperature measured. Circuitry connected to the sensing element detects variations of resistance within the sensing element. The circuit provides an output of a first state when the detected resistive value increases beyond a first point and provides an output of a second state when the detected resistive value decreases beyond a second point.

In an embodiment of this invention, a temperature sensing circuit is provided that includes a temperature sensing element or thermistor with a resistance that varies according to the temperature measured. An external resistor network is connected to the thermistor. A circuit is connected to this resistor network and the termistor. The circuit includes two comparators, a latch and an internal resistance network. The external resistor network is connected to the comparators. An internal resistor network is also connected to the comparators. The circuit receives a voltage which is placed across both resistive networks and sensing elements. The voltage across the thermistor varies as a result of thermistor resistance changes from temperature variances. The comparators compare the resulting voltages of the two resistive networks and sets or clears the latch accordingly. The output of the latch is an output signal wtih two states. The first state is provided when the element resistance increases beyond a first transition point. The second state is provided when the element resistance decreases beyond a second transition point. The values of resistors in the first resistor network are selected in combination with the resistive range characteristics of the thermistor to provide these transition points at preselected temperatures.

In a further embodiment of this invention, the output is connected to a relay which may be used to activate a switch. An application for this embodiment would be an air conditioner wherein the thermistor is placed on the evaporator coil and the relay is connected to power the compressor. The temperature sensing circuit would insure proper operation of the compressor relative to the temperature condition of the evaporator coil.

In a further embodiment, the temperature sensing circuit may be self contained within a housing providing a single unit temperature probe.

In a further embodiment, the temperature sensing circuit may be self contained within a housing providing a single unit temperature probe.

BRIEF DESCRIPTION OF THE DRAWINGS

The above and other features and advantages of this invention will become more apparent as the invention becomes better understood by the detailed description that follows, when considered in connection with the accompanying drawings.

DETAILED DESCRIPTION OF THE PREFERRED EMBODIMENT

This invention includes a temperature sensing circuit with two temperature transition points. One transition point provides an off-to-on output transition state and the second transition point provides an on-to-off output transition output state.

Figure 1A:
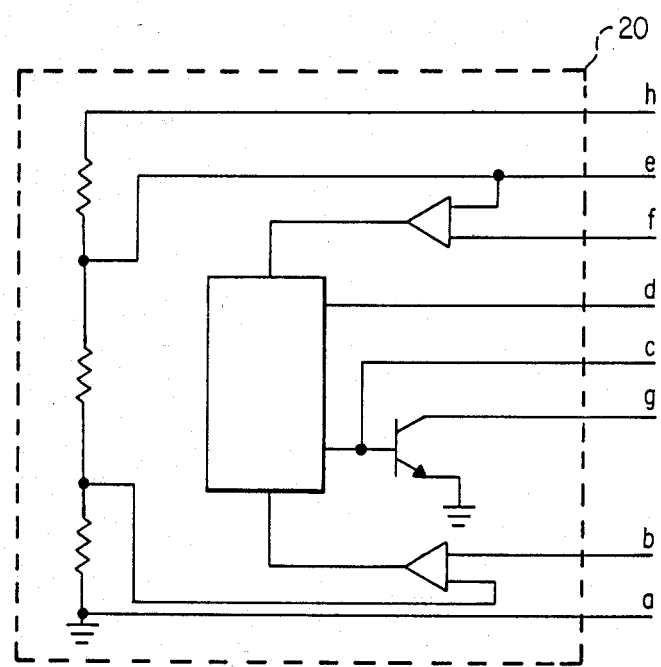
FIG. 1a is a schematic diagram of a prior art timer circuit.
Figure 1B:
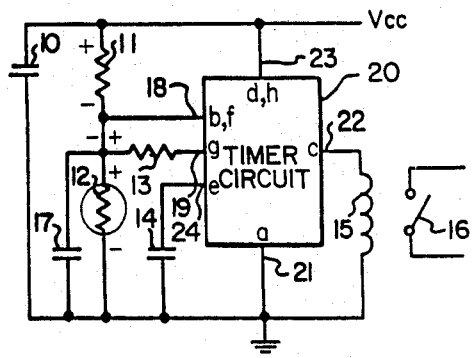
FIG. 1b is a schematic diagram of the temperature sensing circuit invention.

FIG. 1b is a schematic diagram of an embodiment of this invention. The device 20 is a 555 timer circuit. Line 23 (FIG. 1a) provides the Vcc voltage input and a constant RESET-(i.e. reset always off) to device 20. Line 21 is connected to ground. Line 18 is a threshold and trigger input. Line 19 is a discharge line and line 24 is a control voltage line. Line 22 is the output. Device 20, the 555 timer, is detailed in the specification information for the National Semiconductor LM555 contained in the *National Semiconductor Linear Data Book*-1983 and the specification information for the Intersil ICM 7555 contained in the *Intersil Data Book*, both herein incorporated by reference.

Capacitors 10, 14, and 17 are decoupling capacitors that serve to ground any transient current components. Resistors 11, 12 and 13 (R11, R12, R13) are the source of the input voltages for the circuit. Specifically, R12 is a thermistor which is connected to the desired medium for temperature measurement. R11 and R13 are fixed resistors. In operation, the device 20 provides an output on line 22 which is directed through the coil 15 to trigger switch 16. Coil 15 and switch 16 comprise a relay in the preferred embodiment.

This embodiment is designed to measure a temperature with R12 and provide an output signal on line 22 when the measured temperature rises above a first temperature point and to terminate the output signal when the measured temperature falls below a second temperature point. Accordingly, R11 and R12 are selected to determine the second temperature point and R13, in combination with R11 and R12, select the first temperature point. In operation, the resistive value of thermistor R12 increases as the measured temperature becomes lower. Therefore, the second or low temperature point is selected by having $R11/(R11+R12)=2/3$, where R12 is the thermistor resistive value at the low temperature point. The first temperature point is selected by selecting R13 to satisfy the equation.

$$\frac{\frac{R11 \cdot R13}{R13 + R12}}{R11 + \frac{R13 R12}{R13 + R12}} = \frac{1}{3},$$

where R12 is the thermistor resistive value
at the high temperature point

In this embodiment, the value of R11 may be selected independently from the value R13.

Figure 2:
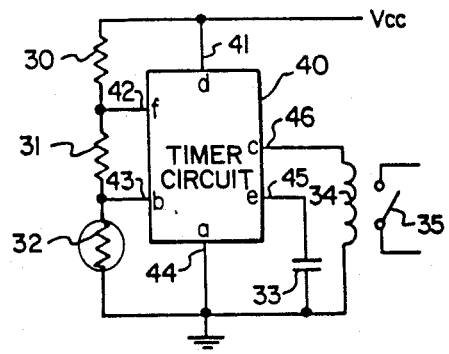
FIG. 2 is a schematic diagram of a second embodiment of the temperature sensing circuit invention.

A second embodiment is illustrated in FIG. 2. Again, device 40 is a 555 timer circuit with line 41 connected to Vcc and line 44 connected to ground. Line 42 is the threshold input and line 43 is the trigger. Line 45 is the control voltage line and line 46 provides the output signal to coil 34 which activates switch 35. The resistive values of resistors 30 and 31 (R30 and R31) are selected to set high and low temperature trigger points according to the resistive/temperature characteristics of thermistor 32 (R32). For the low temperature trip point, the values of R30 and R31 are selected to satisfy the equation:

$$\frac{R31 + R32}{R30 + R31 + R32} = \frac{2}{3}, \quad (1)$$

where R32 is the thermistor resistive value
at the low temperature point.

For the high temperature trip point, the valves of R30 and R31 are selected to satisfy the equation:

$$\frac{R32}{R30 + R31 + R32} = \frac{1}{3}, \quad (2)$$

where R32 is the thermistor resistive value
at the high temperature point.

As an example of the embodiment in FIG. 2, for a thermistor with a resistive value of 30,000 Ohms at 0 degrees Celsius and 26,000 Ohms at 3 degrees Celsius the values of R30 and R31 are 27,333 Ohms and 24,667 Ohms respectively. The resulting circuit provides a temperature hyteresis effect between the transition of 0° C. and 3° C. It should be apparent that a variable resistor or potentiometer may be used to adjust the resistive values to adjust the temperature trip points.

Figure 3:
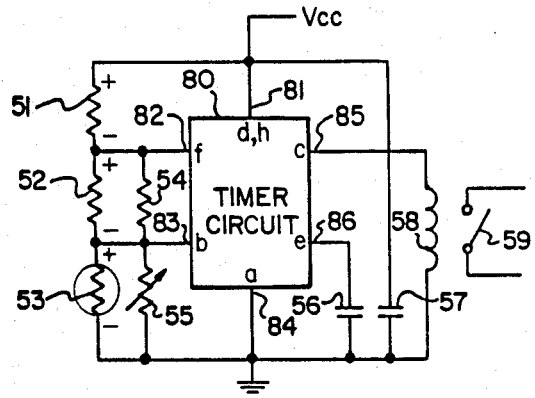
FIG. 3 is a schematic diagram of a temperature sensing circuit embodiment including a variable resistor for adjusting a transition point.

FIG. 3 is an illustration of the invention with a variable resistor. Device 80 is the 555 timer with lines 81 and 84 being Vcc and ground respectively. Line 82 and 83 are the threshold and trigger lines with lines 85 and 86 being the output and control voltage lines. In this embodiment, thermistor 53 is connected in parallel with variable resistor 55 which provides an adjustment of the thermistor resistive chatacteistics for a temperature range. Additionally, R54 is provided in addition to R51 and R52 to provide trimming of the temperature difference between the high and low temperature trip points. This configuration results in a versatile circuit that may be adjusted to yield the desired operating characteristics for triggering switch 59 with coil 58.

The 555 timer is an integrated circuit that is approximately equivalent to two comparators connected to a flip-flop or latch. The two comparators are connected to an internal resistive network. It is the combination of the values of the internal resistive network together with the external resistive networks that provide the operating characteristics of the present invention. Thus, the proper operation of the invention is independent of minor variations in Vcc. Using a CMOS version of the 555 timer will reduce the power requirements of the invention and enable the sensing circuit to be used almost any place where voltage is available for Vcc.

Figure 4:
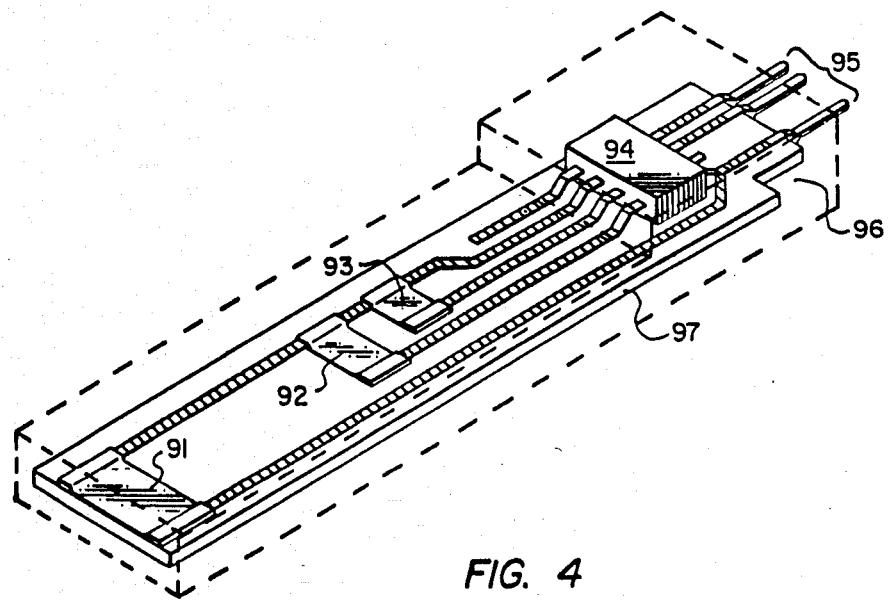
FIG. 4 is a pictorial view of a temperature probe.

FIG. 4 illustrates a still further embodiment, wherein the invention is implemented as a temperature probe having a thermistor 91 connected to a 555 integrated circuit 94 with two resistors 92 and 93 all mounted upon a board 97 and environmentally isolated by a case 96. The power and output lines to and from the probe are provided on pins 95. One application for this probe would be with an evaporator coil of an air conditioner. The probe would be located having the thermistor measure the evaporator coil temperature. The output of the probe would activate a switch which powers the compressor. When the temperature of the evaporator coil falls below a low temperature trip point the probe would deactivate the compressor. The compressor would remain deactivated until the evaporator coil temperature rises above a high temperature trip point wherein the compressor would be reactivated. The output of the invention would therefore be used to control the compressor to ensure proper operation of the unit in relation to the temperature of the evapoator coil.

Although the invention has been described in detail in the embodiments within this specification, it is to be understood by those familiar with the art, that this invention may be embodied in other specific forms without departing from the spirit and scope of the invention as defined by the appended claims.

What is claimed is:

1. A temperature sensing apparatus comprising:
   a first and second set point temperature sensing circuit including a thermistor for placement in operative association with a medium and connected to a voltage divider having first and second resistors of preselected values for generating first and second voltages indicative of the medium's first and second set point temperatures; and
   a 555 timer having its threshold and trigger inputs coupled to the voltage divider for monitoring first and second voltages from the set point temperature sensing circuit, said 555 timer outputting first and second logic state output signals indicative, respectively, of temperatures below the first set point temperatures and above the second set point temperature wherein a hysteresis effect is generated for switching between the first and second logic state output signals.

2. The temperature sensing apparatus of claim 1 where the first and second resistors are coupled in series with the thermistor and the first and second voltages are generated at a first node between the first and second resistors and a second node between one of said first and second resistors and said thermistor and wherein said threshold input is electrically connected to one of said first and second nodes and the trigger input is electrically connected to another of said first and second nodes.

3. The temperature sensing apparatus of claim 1 wherein a first resistor is coupled to the thermistor and a series combination of the first resistor and the thermistor are coupled between a voltage source and a ground or reference potential, wherein a node between the first resistor and said thermistor is coupled to both the trigger and threshold inputs of said 555 timer, and further wherein the second resistor is coupled between a discahrge connection of the 555 timer and said node between the first resistor and the thermistor; said discharge connection varying the voltage at the node in synchronism with a change in the logic state output signals of said 555 timer.

4. The sensing apparatus of claim 2 comprising a third adjustable resistor coupled to the voltage divider to adjust the first and second voltages and thereby adjust the first and second set point temperatures.

5. A method of monitoring the temperature of a medium and generating a control output when the medium temperature varies from a predetermined range defined by first and second set point temperatures comprising the steps of:
 (a) sensing the medium temperature using a temperature sensitive impedance network having a sensor element in heat transfer relationship with the medium for outputting medium temperature responsive signals from said network;
 (b) coupling network output signals to the trigger input of a 555 timer circuit so that when the sensed medium temperature is altered in one sense direction to one set point temperature the output state of the 555 timer changes;
 (c) coupling network output signals to the threshold input of said 555 timer circuit so that when the sensed medium temperature is altered in the other sense direction to the other set point temperature the output state of the 555 timer changes again; and
 (d) coupling an output device to the 555 timer circuit output so that the timer output states provide a control output for governing the device in response to sensed medium temperature.

6. The method of claim 5 wherein the sensing step is accomplished by coupling a thermistor and two resistors in series to form a voltage divider network having first and second nodes, energizing the voltage divider network to provide a first network output signal at one node and a second network output signal at a second node and coupling a first node to the trigger input and a second node to the threshold input of said 555 timer.

7. The method of claim 5 where the sensing step is accomplished by coupling a first resistor and a thermistor in series to form a node between said thermistor and resistor, energizing the series combination of said thermistor and first resistor, coupling the node to both the threshold and trigger inputs of the 555 timer, coupling the node to a discharge output of said 555 timer through a second resistor to adjust the voltage at said node when the control output changes state in response to the sensing of one set point temperature.

8. The method of claim 6 wherein the sensing step additionally comprises the step of coupling a variable resistor to one node of said voltage divider network to adjust the medium temperature responsive signals to vary the set point temperatures.

* * * * *